Feb. 2, 1965  H. GOLDSCHMIDT  3,168,329
UTILITY CART
Filed Aug. 14, 1963  3 Sheets-Sheet 1

INVENTOR.
HANS GOLDSCHMIDT.
BY
*F. Lehr and Swain*
ATTORNEYS.

Feb. 2, 1965 H. GOLDSCHMIDT 3,168,329
UTILITY CART
Filed Aug. 14, 1963
3 Sheets-Sheet 2

INVENTOR.
HANS GOLDSCHMIDT.
BY
F. Lehr and Luzin
ATTORNEYS.

Feb. 2, 1965 H. GOLDSCHMIDT 3,168,329
UTILITY CART
Filed Aug. 14, 1963 3 Sheets-Sheet 3

INVENTOR.
HANS GOLDSCHMIDT.
BY
ATTORNEYS.

United States Patent Office 3,168,329
Patented Feb. 2, 1965

3,168,329
UTILITY CART
Hans Goldschmidt, Atherton, Calif., assignor to H. Goldschmidt & Associates, Inc., Menlo Park, Calif., a corporation of California
Filed Aug. 14, 1963, Ser. No. 302,143
7 Claims. (Cl. 280—36)

This invention is directed to a cart and more particularly to a utility cart having a variety of various functions in which each of the individual elements of the cart cooperate to produce a common end result.

There have, in the past, been a number of utility carts for household use for such purposes as carrying laundry or utensils, or for hanging clothes. Each of these carts of the prior art, however, has been of the single purpose type wherein a cart suitable for carrying laundry is totally unsuited for hanging pressed or ironed clothes.

It is a general object of this invention to provide an improved utility cart, which is suitable for performing a large number of functions.

It is a more particular object of this invention to provide a utility cart of the aforementioned character which is collapsible into a relatively flat package for storage.

Another object of this invention is to provide a utility cart having the aforementioned characteristics and which includes a vertically disposed frame having thereon a vertically adjustable slide including a horizontal arm at the upper end thereof for receiving clothes hangers and the like; and including along the vertical frame, a pair of arms or guard members extending away from the frame in generally the same direction as the horizontal arm of the vertical slide, whereby the horizontal extension of the vertical slide and the arms on the frame cooperate to receive and retain hanging garments.

It is another object of this invention to provide a utility cart of the aforementioned character which is suitable for various other functions in cooperation with one or more trays, containers or baskets.

These and other objects and features of the invention will become more clearly apparent upon a review of the following description in conjunction with the accompanying drawing, in which.

Figure 1:
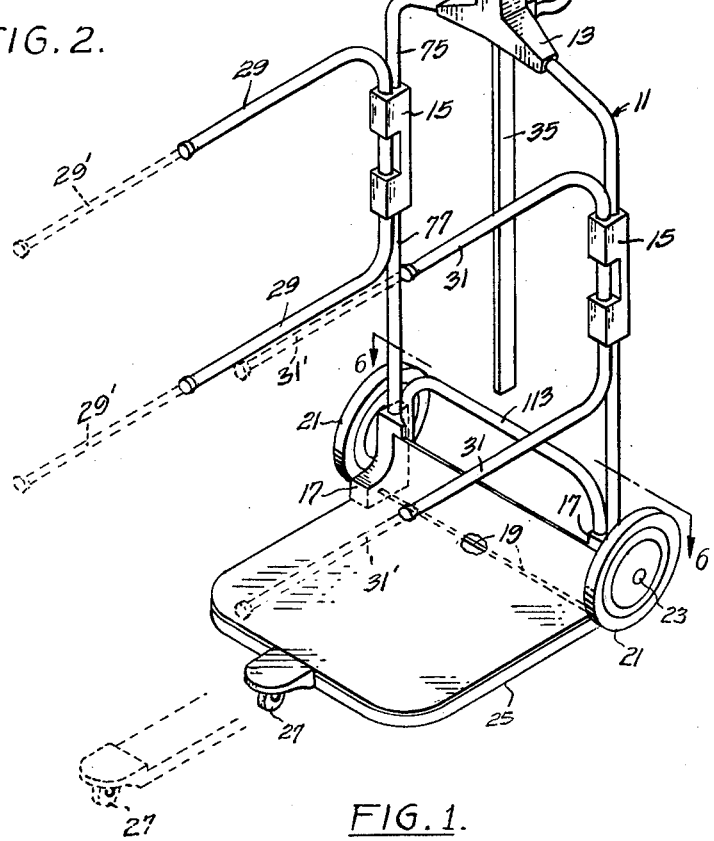
FIGURE 1 is a perspective view of a cart in accordance with a preferred embodiment of this invention.

Referring to FIGURE 1, it is seen that the cart includes a generally vertical frame 11, including a center brace 13 and side brackets 15. The lower extremities of the vertical frame 11 includes wheel brackets 17 which are joined together by a fixed shaft 19. Wheels 21 are rotatably secured to the brackets 17 by means of axle studs 23.

Pivoted about the shaft 19 is a lower shelf or tray 25, having an extendible wheel 27 at that edge remote from the shaft 19.

The brackets 15 receive foldable guide or guard arms 29 and 31 which include telescoping sections that may be extended as shown in dashed lines at 29' and 31'. The center brace 13 includes a handle 33 and a vertically extensible slide 35. The vertically extensible slide 35 includes, at the upper end thereof, an arm 37 which may be extended horizontally as shown in dashed lines in FIGURE 1, or which may be recessed in the vertical extension 35 itself. In certain instances it may be desirable to provide the arm 37 with means to extend in the direction opposite to that showing whereby the arm would lie substantially over the handle 33.

Figure 2:
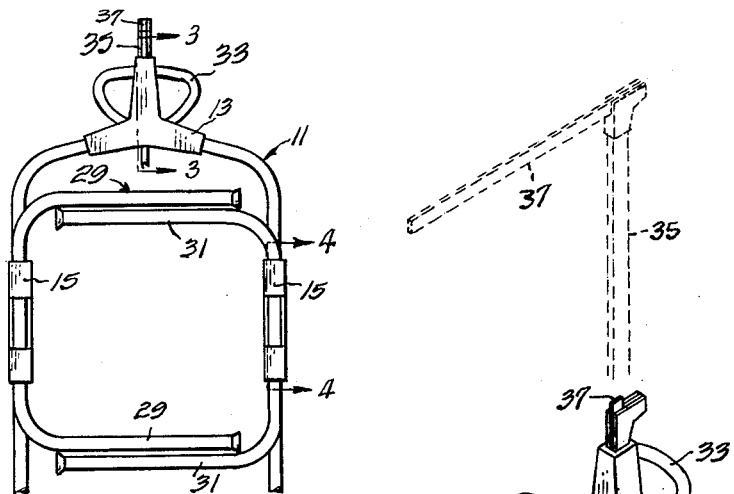
FIGURE 2 is a partial front elevation of the cart shown in FIGURE 1 but with the horizontally extending arms in their folded position.

Referring to FIGURE 2, it is seen that the arms 29 and 31 may be folded together. The mechanism which permits the folding action will be shown hereinafter.

Figure 3:
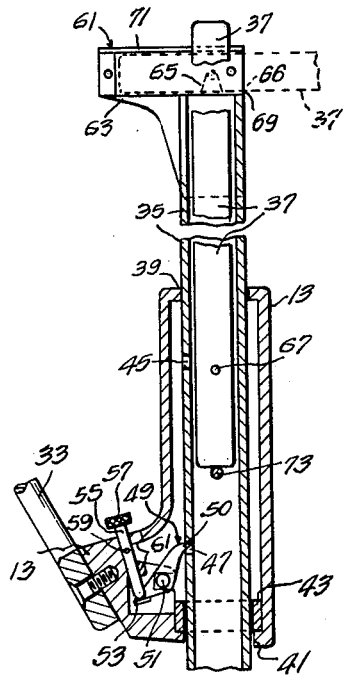
FIGURE 3 is an enlarged sectional view taken along the line 3—3 of FIGURE 2.

Referring to FIGURE 3, a detailed cross sectional view of the center bracket 13 is shown. It is seen that the center bracket includes upper and lower openings 39 and 41 with a guide or bearing member 43 disposed adjacent the lower opening. The slide 35 is journaled for vertical movement through the openings 39 and 41 and the bearing member 43.

The slide 35 includes openings or detents 45 and 47. A lever 49, having a pawl 50 at one end thereof, is pivotally rotated at 51 for cooperation with the detents 45 to 47. The lever 49 includes an offset portion 53 at the end opposite that of the pawl 50. A shaft 55 is slidably received in the brace 13. One end of the shaft 55 includes a push button 57 while the other end cooperates with the offset portion 53 of the lever 49. A pin 59 extends through the shaft 55 and cooperates with the interior portions 61 of the brace 13 to prevent excess axial motion thereof. Thus, it is seen that upon depression of the button 57 the lever 49 is rotated counterclockwise and the pawl 50 is raised away from the slide 35 and its detents 45 and 47. Consequently, the slide 35 may be lowered or raised to positions corresponding to the various detents 45 to 47.

The upper end of the slide 35 includes a bracket 61 for slidably and pivotally receiving the arm 37. The bracket 61 includes a member 63 having a triangular cutout 65 in the side thereof. The upper edge of the bracket 61 is cut out at 66 whereby the arm 37 is permitted to pass. The arm 37 includes a pin 67 extending therethrough which serves, in cooperation with the triangular opening 65, to limit the vertical movement of the arm 37. Thus, the arm 37 may be raised through the slide 35 until the pin 67 contacts the apex of the opening 65. Thereafter, the arm 37 may be rotated in a clockwise direction to the position shown by the dashed lines. In this position the upper edge 69 of the slide 35 serves as a fulcrum. The trailing edge of the slide 37 is retained by the over-extending portion 71 of the bracket 61. Reinsertion of the arm 37 into the slide 35 may be accomplished by repeating these steps in reverse order. A pin 73 located in the slide 35 serves to limit the downward movement of the arm 37, within the slide.

Figure 4:
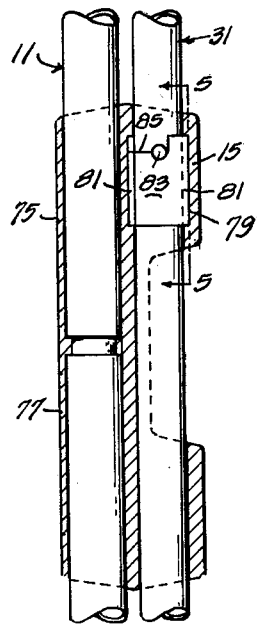
FIGURE 4 is an enlarged sectional view taken along the line 4—4 of FIGURE 2 but with the arms in their extended position.
Figure 5:
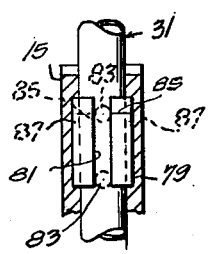
FIGURE 5 is a sectional view taken along the line 5—5 of FIGURE 4 but with the arms in their folded position.

Referring to FIGURE 4, a detailed view of the side brackets 15 are shown together with the mechanism for folding the arms 29 and 31. Thus, it is seen that each of the brackets 15 serves to clamp together two portions 75 and 77 of the generally vertical frame 11. Moreover, one of the brackets 15 serves to rotatably and slidably retain the arm while the other bracket 15 serves to rotatably retain the arm 29. In that bracket 15, associated with the arm 31 there is included an insert 79 which is generally cylindrical in shape but is parted along diametrically opposite lines by keyways 81 (FIGURE 5).

The keyways 81 serve to selectively receive a pin 83 secured to the arm 31. Adjacent each of the keyways 81 is a cut-out portion 85 over the top of each of the cylindrical inserts 79. Thus, when the arm 31 and its rigidly secured pin 83 is slightly raised the arm 29 may be rotated within the cylindrical insert with the pin 83 riding cross the top of the cut away portion 85. Each of the cut away portions 85 terminate in a detent 87 which serves, in conjunction with the pin 83, as a positioning lock for the arm 31. Thus, with the pin 83 retained in the detent 87, as shown in FIGURE 4, the arm 31 is in the position as shown in FIGURE 1. However, when the arm is slightly raised (which may be done merely by rotating the arm 31 itself to effect a camming action between the pin 83 and the side of the detent 87) the pin 83 may be rotated to the position shown in FIGURE 5 to be lowered until it reaches the position as shown at 83'. In this position the arm 31 is as shown in FIGURE 2.

The arm 29 is supported in a somewhat similar manner but no keyways 81 are employed. Consequently, the arm 29 retains the same vertical level regardless of its rotary position within the bracket 15.

Figure 6:
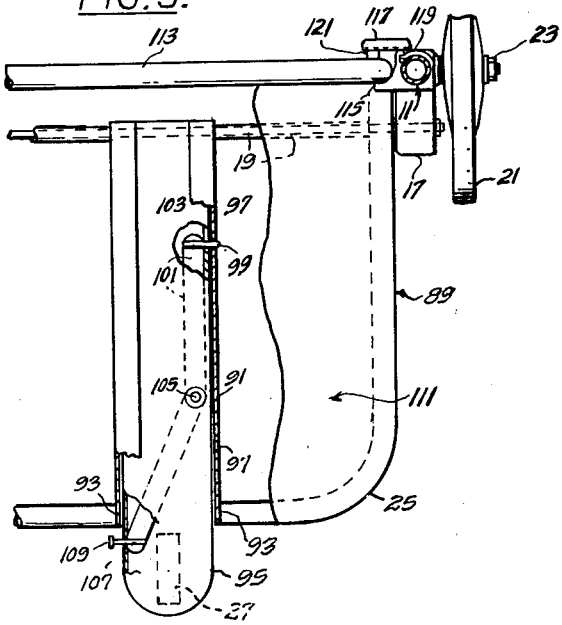
FIGURE 6 is a partial sectional view taken along the line 6—6 of FIGURE 1 and with parts broken away.
Figure 7:
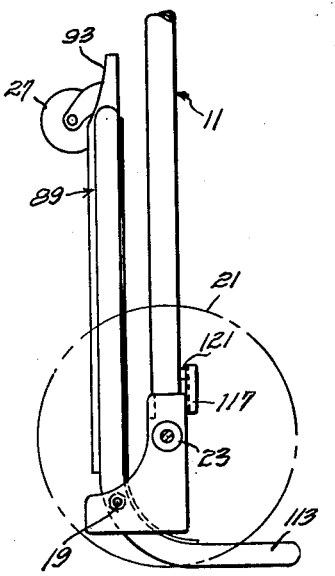
FIGURE 7 is a partial side elevation of the cart shown in FIGURE 1 with the bottom tray in its folded position.

Referring to FIGURES 6 and 7, the operation of the bottom tray or shelf 25 is shown. The bottom tray includes a frame 89 which may be of tubular construction and which is pivotally connected on the shaft 19. A tongue 91 is likewise pivotally connected to the shaft 19 and secured to the frame 89 as at 93. A tongue slide 95 is telescoped within the tongue 91 and serves to support the wheel 27.

Latching means are included in connection with the telescoping tongue and tongue slide whereby extended or retracted positions may be maintained. To this extent the tongue 91 includes openings 97 in a side wall thereof and the tongue slide 95 includes a pin 99 mounted at one end of a bell crank 101. The pin 99 passes through an opening 103 in the tongue slide and the bell crank 101 is pivoted on the tongue slide as at 105. The opposite end of the bell crank is connected to a pin 107, one end of which includes a button 109. Upon depression of the button 109 the bell crank 101 is rotated in the counterclockwise direction about the pivot point 105 to retract the pin 99 from the opening 97. Thus, the tongue slide is free to telescope within the tongue 91.

Overlying the tongue 99 and the frame 89 is a tray portion 111, which may be employed as hereinafter described.

The rear of the frame 89 includes an upstanding portion 113 which, when the tray is in the position shown in FIGURE 1, lies abutted to the recessed portion 115 of the wheel frame 17. A tray latch 117 is pivotally supported as at 119 and includes at the end thereof a pad of material such as nylon 121 which serves to latch the upstanding portion 113 of the frame 89 against the wheel frame 17 whereby the tray 25 is retained in the position as shown in FIGURE 1.

If it is desired to fold the bottom tray, the latch members 117 are withdrawn by rotating about the pivot points 119. The tray 25 along with its frame 89 is rotated about the shaft 19 until it reaches a position as shown in FIGURE 7.

Figure 9:
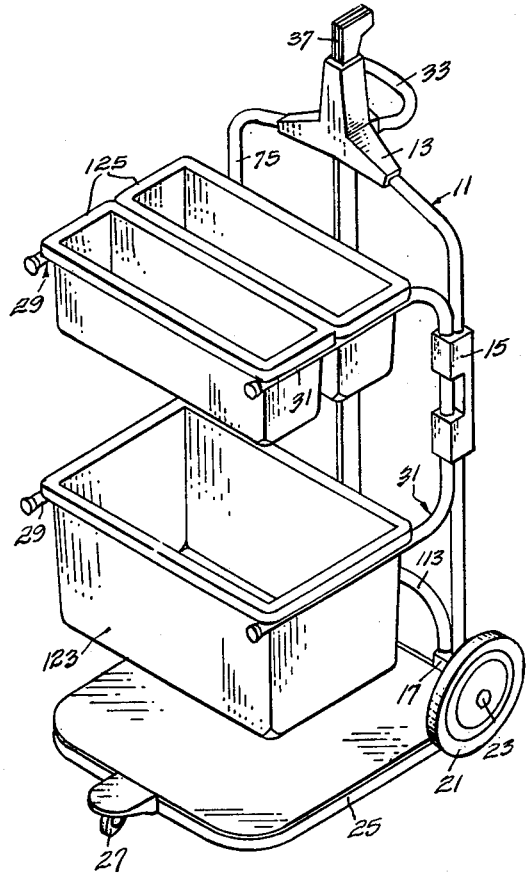
FIGURE 9 is a perspective view of the cart shown in FIGURE 1 being used in conjunction with a plurality of trays and/or buckets.
Figure 8:
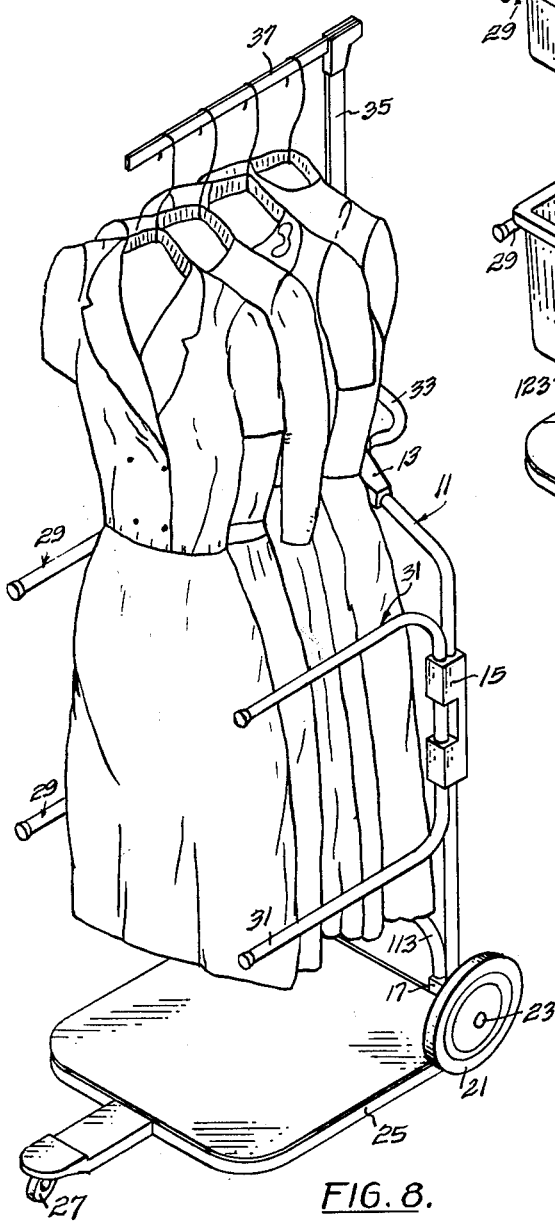
FIGURE 8 is a perspective view of the cart shown in FIGURE 1 being used as a portable rack for carrying and retaining dresses.

FIGURES 8 and 9 show various methods in which the cart may be used. In FIGURE 8 it is seen that the cart is used to hang, retain and protect dresses which may have been pressed or which may be of the drip dry type being hung to dry. In this instance, the bottom tray 25 serves to catch the drippings from the dresses or to retain a receiver for such drippings. In each instance the arm 29 and 31 serve to retain the dresses in a generally square area over the tray 25. The slide 35 and the arm 37 cooperate together to retain the dresses in a raised position over the bottom tray. It is apparent that with the combination as shown in FIGURE 8 the dresses may be easily moved from one location to the other and that the cart serves to protect them and to keep them in position.

Referring to FIGURE 9 there is still another use as shown for the cart of this invention. In this instance the bottom portion of the arms 29 and 31 retain a large basket 123 while the upper portions of the arms 29 and 31 retain a plurality of smaller baskets or totes 125. With the carts so arranged it is suitable for several household chores. For instance, the basket 123 may be employed to collect trash or to hold rags or the like. While the tote 125 may be used to retain such items as scrub brushes, soap and the like.

The utility cart has many other uses such for instance, as holding wet shirts to be drip dried. In this instance, the shirts may be hung along the rack similar to the dresses in FIGURE 8 and a basket, such as the basket 123 may be retained on the arms 29 and 31 to receive the drippings from the shirt.

In using the cart for household chores the slide 35 and arm 37 may cooperate with the tray 25 and/or the arms 29 and 31 to receive and retain such items as mops or brooms.

Moreover, the utility cart may be used as a dinner cart whereby a tray of food to be warmed may be held on the upper arms 29 and 31 with a heating lamp extended from the extensions 37. A tray disposed on the lower portion of the arms 29 and 31 may be used to receive dishes, glasses and the like.

Thus, it is seen that an improved utility cart has been provided which is collapsible into a flat easily stored device. A top horizontal arm may be easily recessed into the vertical slide whereby the size of the folded cart is still further reduced.

I claim:

1. A utility cart comprising a generally vertical frame, a slide vertically extendable with respect to said frame, an arm slideably and pivotally received at the upper end of said slide, said arm having at least two positions one of which is generally horizontal, guide arms foldably secured to said vertical frame, said guide arms having at least two positions one of which is perpendicular to said generally vertical frame.

2. A utility cart as defined in claim 1 wherein said arm at the upper end of the slide, and said guide arms, in one position of each of them, all extend perpendicularly from said generally vertical frame in the same direction.

3. A utility cart as defined in claim 1 together with a tray pivotally disposed at the lower end of said generally vertical frame.

4. A utility cart as defined in claim 1 together with a pair of wheels disposed at the lower end of the generally vertical frame.

5. A utility cart as defined in claim 4 together with a tray pivotally connected at the lower end of said generally vertical frame, and wheel means disposed on said tray at that end thereof remote from the connection between the tray and the vertical frame.

6. A utility cart as defined in claim 1 wherein said guide arms are extendable.

7. A utility cart comprising a generally vertical frame, a slide vertically extendable with respect to said frame, an arm slidably and pivotally received at the upper end of said slide, said arm having at least two positions one of which is generally horizontal, guide arms foldably secured to said vertical frame, said guide arms having at least two positions one of which is perpendicular to said generally vertical frame, and means responsive to folding one of said guide arms for freeing said one guide arm for vertical travel whereby said one guide arm is lowered when placed in its folded position.

References Cited by the Examiner

UNITED STATES PATENTS

| | | | |
|---|---|---|---|
| 1,419,160 | 6/22 | McKinnon | 280—34 |
| 2,660,446 | 11/53 | Edhardt | 280—36 |
| 2,677,518 | 5/54 | Happy et al. | 211—178 X |
| 2,904,383 | 9/59 | Potts | 312—293 |
| 3,052,484 | 9/62 | Huffman et al. | 280—36 |

FOREIGN PATENTS 826,533   1/38   France.

ARTHUR L. LA POINT, *Primary Examiner*.